(12) United States Patent
Ishibashi et al.

(10) Patent No.: US 7,124,443 B2
(45) Date of Patent: Oct. 17, 2006

(54) INFORMATION TRANSACTION SYSTEM

(75) Inventors: Yoshihito Ishibashi, Tokyo (JP); Taizo Shirai, Tokyo (JP)

(73) Assignee: Sony Corporation(JP)

( * ) Notice: Subject to any disclaimer, the term of this patent is extended or adjusted under 35 U.S.C. 154(b) by 947 days.

(21) Appl. No.: 09/958,731

(22) PCT Filed: Feb. 15, 2001

(86) PCT No.: PCT/JP01/01097

§ 371 (c)(1),
(2), (4) Date: Oct. 12, 2001

(87) PCT Pub. No.: WO01/61911

PCT Pub. Date: Aug. 23, 2001

(65) Prior Publication Data

US 2002/0138733 A1     Sep. 26, 2002

(30) Foreign Application Priority Data

Feb. 15, 2000    (JP) .............................. 2000-036353

(51) Int. Cl.
| | |
|---|---|
| G06F 11/00 | (2006.01) |
| G06F 11/22 | (2006.01) |
| G06F 11/30 | (2006.01) |
| G06F 11/32 | (2006.01) |
| G06F 11/34 | (2006.01) |
| G06F 11/36 | (2006.01) |
| G06F 12/14 | (2006.01) |
| G06F 12/16 | (2006.01) |
| G06F 15/18 | (2006.01) |
| G06B 23/00 | (2006.01) |

(52) U.S. Cl. ............................ 726/26; 726/27; 726/28; 705/51; 705/52; 705/53; 705/57; 705/59

(58) Field of Classification Search ................. 705/52, 705/57, 58; 713/193, 176
See application file for complete search history.

(56) References Cited

U.S. PATENT DOCUMENTS 5,677,953 A * 10/1997 Dolphin ....................... 705/51

(Continued)

FOREIGN PATENT DOCUMENTS

JP          9-245139          9/1997

(Continued)

OTHER PUBLICATIONS

Network ga Ongaku Ryutsu wo kaeru: "Sound Jam" Jisshou Jikken ni Sanka shiyou, INTERNET magazine, No. 36, pp. 406-409, Jan. 1, 1998.

(Continued)

*Primary Examiner*—Kambiz Zand
*Assistant Examiner*—Benjamin E. Lanier
(74) *Attorney, Agent, or Firm*—Lerner, David, Littenberg, Krumholz & Mentlik, LLP

(57) ABSTRACT

A content use rights discrimination card corresponding to encrypted content is sold to a user. The user transmits data recorded on the content use rights discrimination card to a content use rights management center. The content use rights management center then verifies the content and the card, based on data in the received content use rights discrimination card, to encrypt a decoding key for decoding the content together with, for example, a session key, to transmit the encrypted content key to the user. The content use rights discrimination card, when sold to the user, can be set for enabling resale and transferred between different users so that the decoding key can be transmitted plural times from the content use rights management center. This procedure enables content to be utilized without executing any on-line settlement processing.

17 Claims, 14 Drawing Sheets

| CONTENTS ID | SERIAL NUMBER | NUMBER OF TIMES OF SALE | PURCHASER INFORMATION | USER DISCRIMINATION DATA | USER EQUIPMENT DISCRIMINATION DATA | OTHERS |
|---|---|---|---|---|---|---|
| 01234567 | 0000123 | 0 | | | | REPRINT IMPOSSIBLE |
| 01234567 | 0000124 | 0 | | | | REPRINT IMPOSSIBLE |
| 99999999 | 0000125 | 1 | ACD22222 | BCD38432 | ABA23255 | REPRINT POSSIBLE |
| 99999999 | 0000126 | 2 | BBF33333 | BBB28756 | BBC37854 | REPRINT POSSIBLE |
| 22222222 | 0000127 | 5 | CBD36578 | CDA15683 | BBA36529 | MAX NUMBER OF TIMES OF SALE N |
| 22222222 | 0000128 | N-1 | BDD28215 | ABB19653 | CBB35532 | MAX NUMBER OF TIMES OF SALE N |

U.S. PATENT DOCUMENTS

| | | | |
|---|---|---|---|
| 5,918,215 A * | 6/1999 | Yoshioka et al. | 705/30 |
| 6,047,964 A * | 4/2000 | Lawandy et al. | 273/138.1 |
| 6,311,214 B1 * | 10/2001 | Rhoads | 709/217 |
| 6,499,106 B1 * | 12/2002 | Yaegashi et al. | 713/193 |
| 6,751,598 B1 * | 6/2004 | Yagawa et al. | 705/51 |
| 6,832,318 B1 * | 12/2004 | Yaegashi et al. | 713/193 |
| 2001/0042048 A1 * | 11/2001 | Boykin et al. | 705/51 |

FOREIGN PATENT DOCUMENTS

| | | |
|---|---|---|
| JP | 9-259085 | 10/1997 |
| JP | 11-3372 | 1/1999 |
| JP | 11-145948 | 5/1999 |
| JP | 11-161611 | 6/1999 |
| JP | 2000-20795 | 1/2000 |
| WO | 96/27155 | 9/1996 |
| WO | 97/03423 | 1/1997 |

OTHER PUBLICATIONS

Internet Taiou Shogaku Kessai System to sore ni yoru starashii Business Model Rei, Joho Media Symposium, 1998 Ronbunshu, pp. 59-64, Sep. 24, 1998.

Microfilm of the specification and drawings annexed to the request of Japanese Utility Model Application No. 4294/1979 (Laid-open No. 1047675/1980) (Suehiro Housou Kogyo K.K.) (Jul. 22, 1980).

Denshi Kessai System no Jissou to Hyouka, Jouhou Shori Gakkai Kenkyu Houkoku, "Implementation and Evaluations of Electronic Payment System", vol. 96, No. 40 (96-DPS-76), pp. 97-102 (May 16, 1996), 3.Teian Houshiki no Gaiyou.

* cited by examiner

| CONTENTS ID | SERIAL NUMBER | ELECTRONIC SIGNATURE |
|---|---|---|
| 01234567 | 0000123 | 34251748 |

FIG.4

| CONTENTS ID | SERIAL NUMBER | NUMBER OF TIMES OF SALE | PURCHASER INFORMATION | OTHERS |
|---|---|---|---|---|
| 01234567 | 0000123 | 0 | | REPRINT IMPOSSIBLE |
| 01234567 | 0000124 | 0 | | REPRINT IMPOSSIBLE |
| 99999999 | 0000125 | 1 | ACD22222 | REPRINT POSSIBLE |
| 99999999 | 0000126 | 2 | BBF33333 | REPRINT POSSIBLE |
| 22222222 | 0000127 | 5 | | MAX NUMBER OF TIMES OF SALE N |
| 22222222 | 0000128 | N-1 | | MAX NUMBER OF TIMES OF SALE N |

FIG.5

| CONTENTS ID | SERIAL NUMBER | NUMBER OF TIMES OF SALE | PURCHASER INFORMATION | USER DISCRIMINATION DATA | USER EQUIPMENT DISCRIMINATION DATA | OTHERS |
|---|---|---|---|---|---|---|
| 01234567 | 0000123 | 0 | | | | REPRINT IMPOSSIBLE |
| 01234567 | 0000124 | 0 | | | | REPRINT IMPOSSIBLE |
| 99999999 | 0000125 | 1 | ACD22222 | BCD38432 | | REPRINT POSSIBLE |
| 99999999 | 0000126 | 2 | BBF33333 | BBB28756 | ABA23255 | REPRINT POSSIBLE |
| 22222222 | 0000127 | 5 | CBD36578 | CDA15683 | BBC37854 | MAX NUMBER OF TIMES OF SALE N |
| 22222222 | 0000128 | N-1 | BDD28215 | ABB19653 | BBA36529 | MAX NUMBER OF TIMES OF SALE N |
| | | | | | CBB35532 | |

FIG.14

INFORMATION TRANSACTION SYSTEM

BACKGROUND OF THE INVENTION

The invention relates to an information transaction system, an information transaction method and a program providing medium. More particularly, the invention relates to information transaction systems and information transaction methods in which a variety of content information, such as music, picture data or game programs are provided to a user through a recording medium, such as a CD or DVD, or by the distribution over the network, and in which a fee for use of the content is collected or use points are associated with such use.

Nowadays, a variety of software and data, such as game programs, speech data, and picture data, referred to as content, are in circulation via various networks, such as the Internet, or via commercially available media, such as a DVD or CD. The content may be stored in recording devices coupled to recording and/or reproducing apparatus owned by a user, such as a personal computer (PC) or a game appliance, in a memory card or in a hard disc. Once stored, the content can be replayed from the storage medium.

The main elements of the conventional information equipment, such as video game equipment or a PC, include control means for operational control, a connector connected to the control means for connection to a slot formed in a main body portion of the information equipment, and a non-volatile memory for data storage which is connected to the control means. The non-volatile memory is provided in a memory card which may include an EEPROM and a flash memory.

The data stored in the commercially available recording media or content stored in the memory are fetched from the respective memory in response to a user command generated by the game equipment that is used as reproducing equipment or by the main body portion of the information equipment, such as a PC. Alternatively, the data or content are fetched in response to a user command entered through an inputting means for replay through the main body portion of the information equipment or for replay through a display or loudspeaker connected thereto.

The right of distribution, for example, of software content, such as game programs, music data or picture data, is generally owned by the authors or the sellers of the content. Thus, when distributing the content by a recording medium, such as a DVD or a CD, a fee is collected at the time of its sale. Alternatively, when distributing the content over the network, such as via the Internet, user information, such as a credit card number, is acquired to collect the counter-value for the provided content, that is the use fee, from the user.

During distribution, the conventional practice is to allow the use of the software only for authorized users by way of imposing certain restrictions on its use so as to prevent unauthorized duplication. When distributing the content through a recording medium or over a network, the content is encrypted and a key for decoding the encrypted content, known as a content key, is provided only for an authorized user.

For example, on-line distribution systems for digital data or content, which are becoming increasingly popular, are configured so that a user acquires content encrypted over a network or medium. To utilize the content, the distribution center connects a user terminal to a content utilization rights sales center to purchase the rights to use the content on-line and to acquire a key for decoding of the encrypted content.

The encrypted content data can be decoded by an on-line procedure, using the key acquired from the content use rights sale center, such that the data can be restored by decoding to decoded data (or plain text) at a user terminal. The data encrypting and decoding method, which employs a secret key for encrypting the information and a decoding key for decrypting the information, has been used extensively.

Among the variety of data encrypting or decrypting methods employing the secret key and decoding key is a system known as a common key encryption system. The common key encryption system uses a secret key for data encryption, a decoding key used for decrypting the data, and a common key for encryption and decoding by an authorized user to prevent an unauthorized user who does not have the key from accessing the data. Typical of this system is a data encryption standard (DES).

The secret key and the decoding key used in the above-described encryption and decoding may be obtained by an authorized user using a uni-directional function, such as a Hash function based, e.g., on a password. The uni-directional function is a function whose input is extremely difficult to find from the output by a reverse path. For example, a uni-directional function may use a user-selected password as input to generate the secret and decoding keys. It is virtually impossible to derive the password from the secret and decoding keys by tracing a reverse path.

Open key encryption systems exist in which an algorithm different from that used to decode is used to process the secret key during encryption. The open key may be used by unidentified users. Specifically, a document may be encrypted using the open key distributed by the individual or acquired from an authentication office. The document encrypted by the open key may be decoded only by the secret key corresponding to the open key that was used for the encryption. Since the secret key is owned solely by the person who distributed the open key, the document encrypted by the open key may be decoded solely by the owner of the secret key. A typical open key encryption system is the Rivest-Shamir-Adleman (RSA) cipher.

By exploiting this encryption system, encrypted content can be decoded solely by an authorized user.

FIG. 1 shows a typical configuration in which content, such as programs, speech data or video data, are acquired from a data providing means, such as a DVD, a CD 30 or the Internet 40. The content is reproduced by a reproducing means 10, such as game equipment, and can be stored in a memory means 20, such as a floppy disc, a memory card or a hard disc.

The content is encrypted and sent to a user having the replay means 10. An authorized user also receives, in addition to the encrypted data, key data in the form of encryption and decoding keys for the encrypted data.

The reproducing means 10 includes a central processor unit (CPU) 12 that controls the input data reproducing operation that is carried out by a reproducing unit 14. The reproducing unit decodes the encrypted data to reproduce the program and the content provided, such as audio or picture data 12.

The authorized user saves the content in the memory means 20 to later re-use the programs provided. The reproducing means 10 includes a storage processor 13 for this purpose. To prevent unauthorized use of data stored in the memory means 20, the storage processor 13 also encrypts the data.

To encrypt the content, a key for content encryption is used. The saving processor 13 uses content encryption to cipher the content so that the ciphered content may be stored in a storage unit 21 of the storage means 20.

To acquire and reproduce the content stored in the memory means 20, the user obtains encrypted data from the storage means 20 and then executes decoding in the reproducing unit 14 of the reproducing means 10 using a decoding key to acquire and reproduce decoded data from the encrypted data.

To utilize the ciphered content, it is necessary to acquire authenticated use rights for the content from a content use rights sale center, and so it is necessary to purchase the key applicable to the decoding of the ciphered content. There are a variety of methods of payment, such as (1) inputting a credit card number into a terminal for transmission to the content use rights sale center, (2) inputting a user bank account number into a terminal for transmission to the content use rights sale center, (3) registering, at the content use rights sale center, the credit card number or a bank account number in advance so that debits are effected based on the pre-registered data, and (4) using an electronic money for payment.

In the above payment methods (1) to (3), user credit card numbers and the bank account numbers are needed. Thus, users who do not have a credit card or a bank account cannot easily make such payments. Also, for the transaction of the content in smaller units, such as for distributing music content, the transaction may be for a sole musical number. In such a case, the content fee is of a small monetary value. Also, the need to present the credit number or the bank account number tends to restrict the circulation of content.

Such desired use of electronic money as in method (4) is in the tentative stage and the form of utilization is not yet established and thus is not in extensive use.

SUMMARY OF THE INVENTION

The present invention provides a simplified information transaction system and an information transaction method which avoids using credit card numbers, bank account numbers or electronic money in the sale of use rights of the majority of software content, such as for game programs, music data or picture data.

According to an aspect of the present invention, a system comprises user equipment for decoding and exploiting encrypted content and comprises a content use rights management device, connected to the user equipment through communication means, for providing a content key for decoding the encrypted content through the communication means. The user equipment includes means for acquiring content use rights identification data, required for acquiring the content key for decoding the encrypted content, that is recorded on a use rights providing medium provided off-line to the user without the interposition of the communication means. The user equipment also transmits a request for the content key to the content use rights management device through the communication means. The content use rights management device includes means for transmitting the content key, used for decoding the encrypted content, through the communication means to the user equipment based on the content use rights identification data received from the user device through the communication means.

Another aspect of the present invention provides a method for providing a content key, used for decoding encrypted content, from a content use rights management device to a user equipment that is used to decode the encrypted content and use the decoded content. The content key is delivered through communication means. Content use rights identification data, required for acquiring the content key, is recorded on a use rights providing medium supplied to the user off-line without interposition of the communication means. The content use rights discriminating data is transmitted through the communication means from the user equipment to the content use rights management device. The content key for decoding the encrypted content is transmitted through the communication means to the user equipment based on the content use rights identification data received through the communication means from the user equipment.

A further aspect of the present invention provides an apparatus, connected through communication means to user equipment that decodes and exploits encrypted content, for providing a content key, which is used for decoding the encrypted content, via communication means. Reception processing means receives content use rights identification data, which is required for acquiring the content key to decode the encrypted content, from a use rights providing medium off-line. Transmission processing means transmits, through the communication means to the user equipment, the content key for decoding the encrypted content based on the content use rights identification data received from the communication means.

The present invention also provides an apparatus connected, through communication means, to a content use rights management device that provides a content key for decoding encrypted content. Acquisition means acquires content use rights identification data, required for acquiring the content key to decode the encrypted content, which is recorded on a use rights providing medium and provided off-line to a user without interposition of the communication means. Transmission processing means transmits the content use rights identification data, which was acquired by the acquisition means, to the content use rights management device through the communication means. Reception processing means receives the content key transmitted from the content use rights management device through the communication means based on the content use rights identification data.

The present invention also provides an apparatus, connected through communication means to a content use rights management device, for providing a content key for decoding encrypted content. Acquisition means acquires content use rights identification data, required to acquire the content key for decoding the encrypted content, that is recorded in a use rights providing medium which is provided off-line to a user without an intermediary communication means. Transmission processing means transmits the content use rights identification data, acquired by the acquisition means, to the content use rights management device through the communication means. Reception processing means receives the content key transmitted from the content use rights management device through the communication means based on the content use rights identification data.

The present invention also provides a method for receiving a content key, used for decoding encrypted content, from a content use rights management device through communication means. Content use rights identification data, required for acquiring the content key to decode the encrypted content recorded in a use rights providing medium, are provided off-line to a user without an intermediary communication means. The acquired content use rights identification data is transmitted to the content use rights management device through the communication means. The content key is received from the content use rights management device through the communication means based on the content use rights identification data.

The present invention also provides a program providing medium for storing a computer program, located in an information processing apparatus which is connected through communication means to a content use rights management device, that provides a content key for decoding encrypted content. The computer program includes an acquisition step of acquiring content use rights identification data, required for acquiring the content key to decode the encrypted content, which is recorded on a use rights providing medium furnished off-line to a user without an intermediary communication means. A transmission processing step includes the process of transmitting the content use rights identification data, acquired in the acquisition step, to the content use rights management device through the communication means. A reception processing step includes the process of receiving the content key, transmitted from the content use rights management device through the communication means, based on the content use rights identification data.

BRIEF DESCRIPTION OF THE DRAWINGS

FIG. 4 is a diagram showing a data structure of the content use rights discrimination card of the information transaction system of the present invention.

FIG. 5 is a diagram showing a data structure of a database of a content use rights sale center of the information transaction system of the present invention.

FIG. 14 is a diagram showing the data structure of the database of the content use rights sale center of the information transaction system of the present invention.

DETAILED DESCRIPTION

Figure 1:
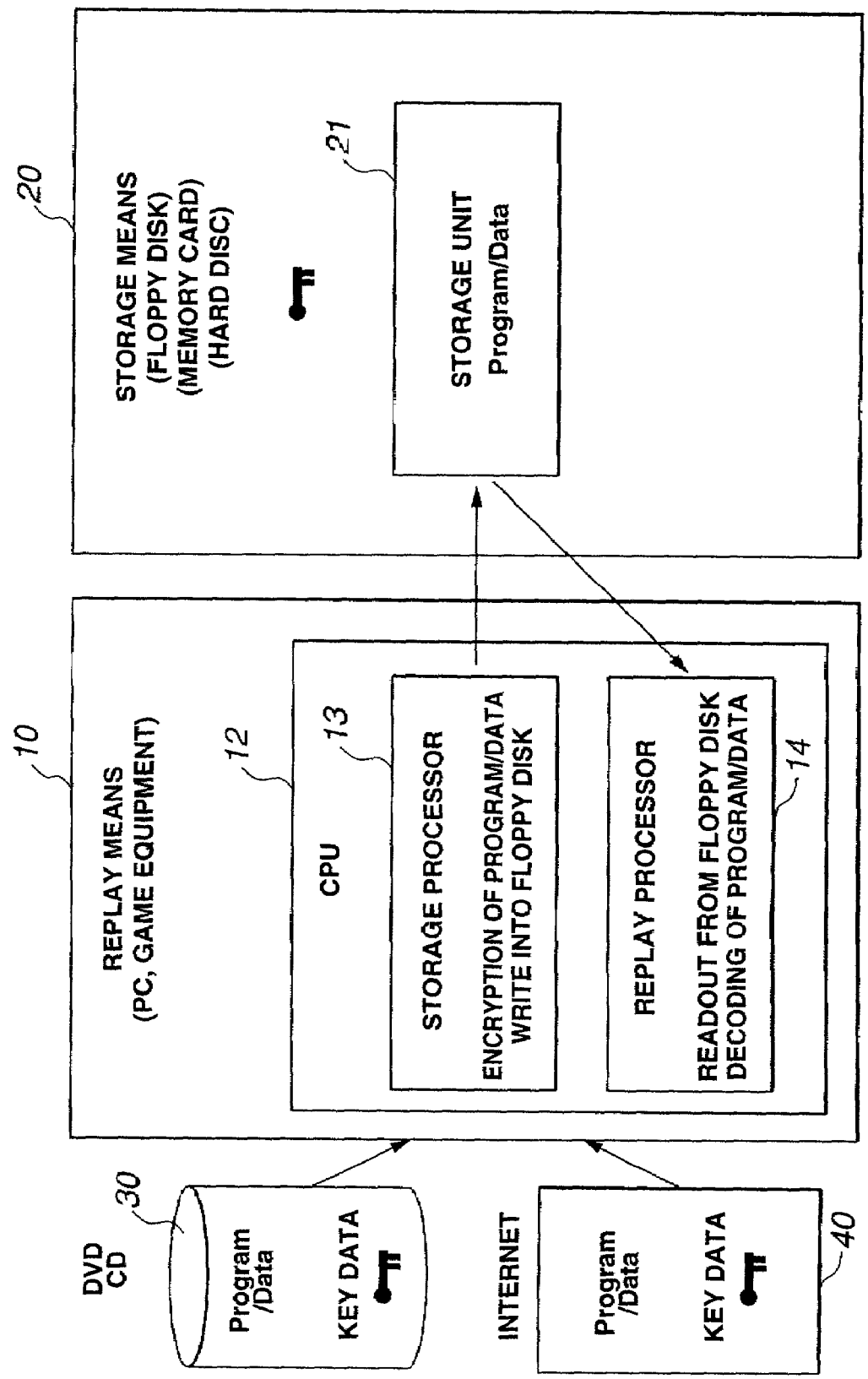
FIG. 1 is a block diagram illustrating a prior art configuration for utilizing encrypted content.

Referring to the drawings, a preferred embodiment of the present invention is explained.

Figure 2:
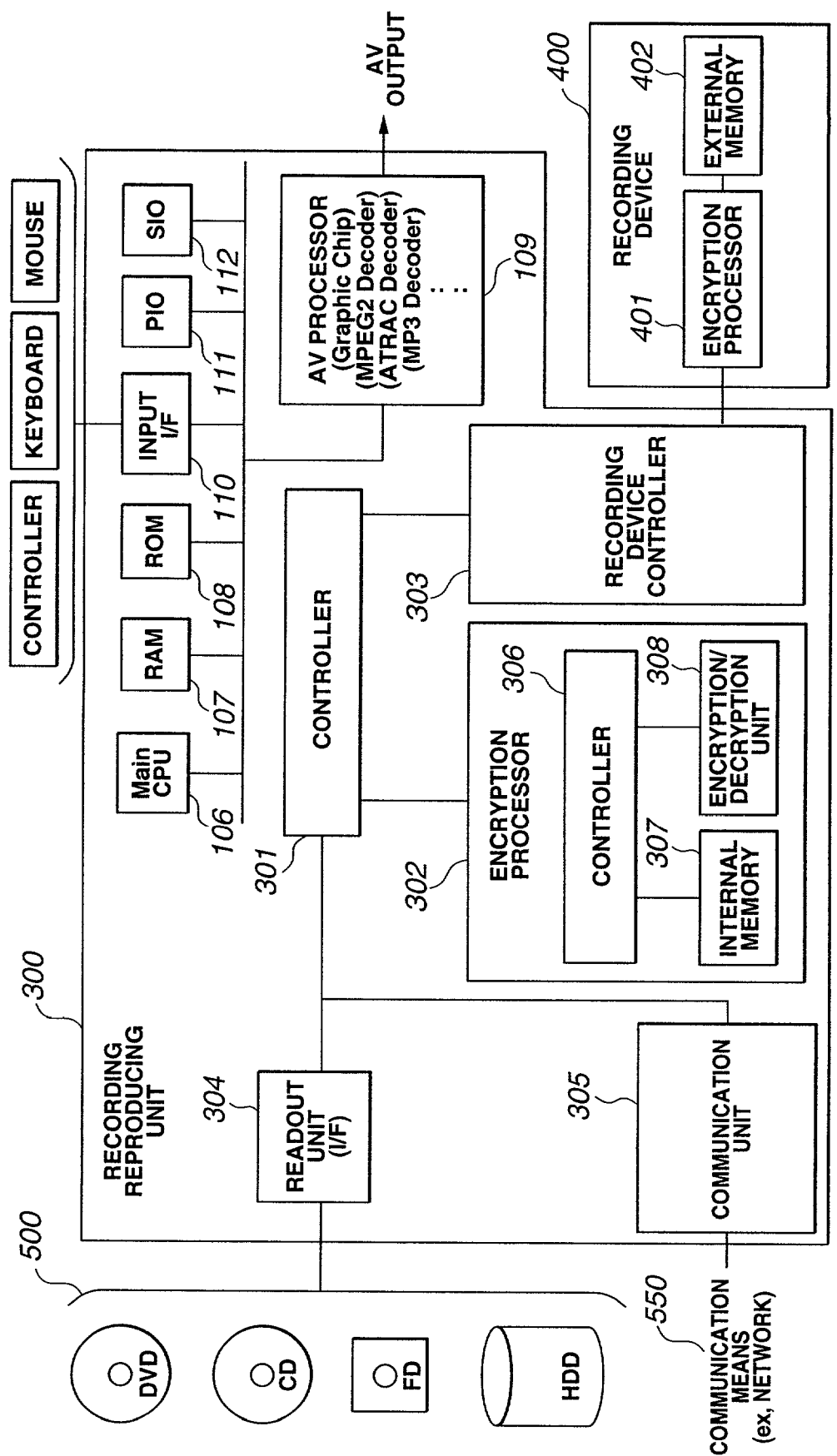
FIG. 2 is a block diagram illustrating the structure of a data processing apparatus in an information transaction system according to the present invention.

FIG. 2 is a block diagram showing an embodiment of a data processing apparatus of a user terminal used in the information transaction system of the present invention. The data processing apparatus is comprised of a recording and/or reproducing unit 300 and a recording device 400. The recording and/or reproducing unit 300 may be a personal computer (PC) or game equipment.

The recording and/or reproducing unit 300 includes a controller 301 for controlling communication with the recording device 400 with respect to ciphering in the recording and/or reproducing unit 300, a cipher processor 302 for cipher processing, a recording device controller 303 for executing authentication processing with the recording device 400 connected to the recording and/or reproducing unit to effect data read/write processing, a readout unit 304 for reading out at least data from a medium 500, such as a DVD, and a communication unit 305 for outside data transmission/reception.

The recording and/or reproducing unit 300 downloads content data intended for storage in the recording device 400, while reproducing other content data from the recording device 400, under control by the controller 301. The recording device 400 is preferably detachable from the recording and/or reproducing unit 300 and may include an external memory 402 formed by a non-volatile memory, such as flash memory, a hard disc or a RAM fitted with a cell.

The recording and/or reproducing unit 300 further includes a readout unit 304 that provides an interface for content data stored in a recording medium 500, such as a DVD, CD, FD or HDD. Also, a communication unit 305 serves as an interface for content data distributed via a network 550, such as the Internet.

The recording and/or reproducing unit 300 also includes a cipher processor 302 for executing authentication, encryption, decoding and data verification when downloading the content data received via the readout unit 304 or via the communication unit 305. The cipher processor 302 includes a controller 306 for controlling the cipher processor 302 and an internal memory 307 for storing the information, such as for cipher processing, and which is adapted to render data readout from outside extremely difficult. The processor 302 also includes a coding/decoding unit 308 for encryption, decoding, generation and verification of data for authentication or generation of random numbers.

The controller 301 mediates the reciprocal authentication processing between the content use rights sale center, explained with reference to FIG. 3, that is connected through the recording and/or reproducing unit 300 and the communication unit 305 and the cipher processor 302, and mediates decoding processing in the cipher processor 302 of the content key that is encrypted with a session key and sent in the encrypted state. The controller also transmits an initializing command for the recording device 40 through the recording device controller 303 upon loading of the recording device 40, performs reciprocal authentication processing between the coding/decoding unit 308 of the cipher processor 302 of the recording and/or reproducing unit 300 and the recording device 400, and mediates various processing operations, such as check value collation, encryption or decoding operations.

The cipher processor 302 executes authentication processing, encryption processing, decoding processing and data verification processing, and includes the controller 306, an internal memory 307 and the coding/decoding unit 308, as described above.

The controller 306 of the cipher processor 302 executes control pertinent to the cipher processing in general, such as authentication processing and coding/decoding, that is executed in the recording and/or reproducing unit 300. The controller 306 controls the encryption processing in general, such as control of the reciprocal authentication processing executed in the content use rights sale center, explained with reference to FIG. 3. The controller also controls the reciprocal authentication processing executed between the recording and/or reproducing unit 300 and the recording device 400, and controls various processing executed in the coding/decoding unit 308 of the cipher processor 302 in the recording and/or reproducing unit 300, such as downloading or issuing commands for execution of encryption processing of replay content data.

The internal memory 307 holds key data required for reciprocal authentication processing, encryption or decoding that is executed in the recording and/or reproducing unit 300, or holds identification data for the recording and/or reproducing unit. The identification data of the recording and/or reproducing unit are required for the reciprocal authentication processing with the content use rights sale center, as is explained with reference to FIG. 3. The identification data is also registered in a database of the content use rights sale center.

The coding/decoding unit 308 executes processing, such as authentication processing, encryption processing, decoding processing, data verification or random number generation, that is carried out when downloading content data input from outside onto the recording device 400 or when reproducing and executing the content data obtained from the recording device 400 with the aid of, e.g., the key data stored in the internal memory 307.

The internal memory 307, holds crucial information, such as the secret key, and needs to be invulnerable to illicit readout from outside. Thus, the cipher processor 302 is a semiconductor chip not readily accessible from the outside and has a multi-layered structure. The internal memory is tamper-proof and not readable illicitly from outside by being sandwiched by a dummy layer, e.g., an aluminum dummy layer or a lowermost layer, or by low operating voltage and/or narrow frequency width.

In addition to the above-described cipher processing function, the recording and/or reproducing unit 300 includes a main central processing unit (main CPU) 106, a random access memory (RAM) 207, a read-only memory (ROM) 108, an AV processor 109 and a (serial I/O interface (SIO) 112.

The central processing unit (main CPU) 106, together with a random access memory (RAM) 107 and a read-only memory (ROM) 108, operate as a control system for the main body portion of the recording and/or reproducing unit 300, primarily as a replay processor for reproducing data decoded by the cipher processor 302 of the recording and/or reproducing unit 300. For example, the units control reproduction and execution of the content, such as outputting content data read out and decoded by the recording device to the AV processor 109 under the control of the controller 301.

The RAM 107 is used as a main storage memory for performing various processing in the CPU 106, that is, as a work area for processing by the main CPU 106. The ROM 108 stores, e.g., a basic program for booting the operating system (OS) that is started by the main CPU 106.

Specifically, the AV processor 109 performs data compressing/expanding, such as that of an MPEG2 decoder, ATRAC decoder or MP3 decoder, and executes the processing to output data to data outputting equipment, such as a display or a loudspeaker, that is annexed or connected to the main body portion of the recording and/or reproducing unit.

An input/output interface 110 outputs data received from a variety of inputting means connected thereto, such as a controller, a keyboard, or a mouse, to the main CPU 106. Based on the game program then running, the main CPU 106 executes the processing conforming to the user command from the controller.

A parallel I/O interface (PIO) 111 and a serial I/O interface (SIO) 112 are used as connection interfaces with respect to the memory devices, such as a memory card, a game cartridge, or portable electronic equipment.

The main CPU 106 also controls the storing of the settings of the game being executed. Data intended for storage is transferred to the controller 301 which causes the cipher processor 302 to execute ciphering of the saved data that is to be stored as encrypted data in the recording device 400.

The recording device 400 preferably is a recording medium that is detachably mounted on the recording and/or reproducing unit 300 and is formed, e.g., by a memory card. The recording device 400 includes a cipher processor 401 and an external memory 402.

The cipher processor 401 of the recording device 400 downloads content data from the recording and/or reproducing unit 300 and performs reciprocal authentication processing between the recording and/or reproducing unit 300 and the recording device 400 during reproduction of the content data transferred from the recording device 400 to the recording and/or reproducing unit 300, as well as performs encryption or decoding processing or data verification processing. Similar to the cipher processor of the recording and/or reproducing unit 300, the cipher processor 401 includes a controller, an internal memory and a coding/decoding unit. The external memory 402 is formed of a non-volatile memory, such as an EEPROM or flash memory, a hard disc or a RAM fitted with a cell, and holds content data, as described above.

A content provider, when supplying software content, such as game programs, music data or picture data, or the content use rights sale center, when supervising the use rights of the content, encrypts the content it provides and sends the encrypted content to the user through various mediums, such as a DVD or CD, or over a network. If the content is to be circulated through the various media, a card having an identifier proving the content use rights, referred to as a content use rights discrimination card, is sealed so as not to be seen from outside and is packed with the medium for sale. It is also possible to hide the identifier on the content use rights discrimination card with a pre-set member so that the user, when using the content, dismounts the member hiding the identifier to recognize the identifier. The card may, for example, be in the form of a scratch card.

If the content is distributed over the network, the card having the identifier that attests to the content use rights, that is the content use rights discrimination card, is not traded on-line but may be traded off-line, that is via, e.g., a retail store, so that the content use rights discrimination card will be sold apart from the content. The content use rights discrimination card again is sealed in a package so as not to be seen from outside or is designed as a scratch card.

Figure 3:
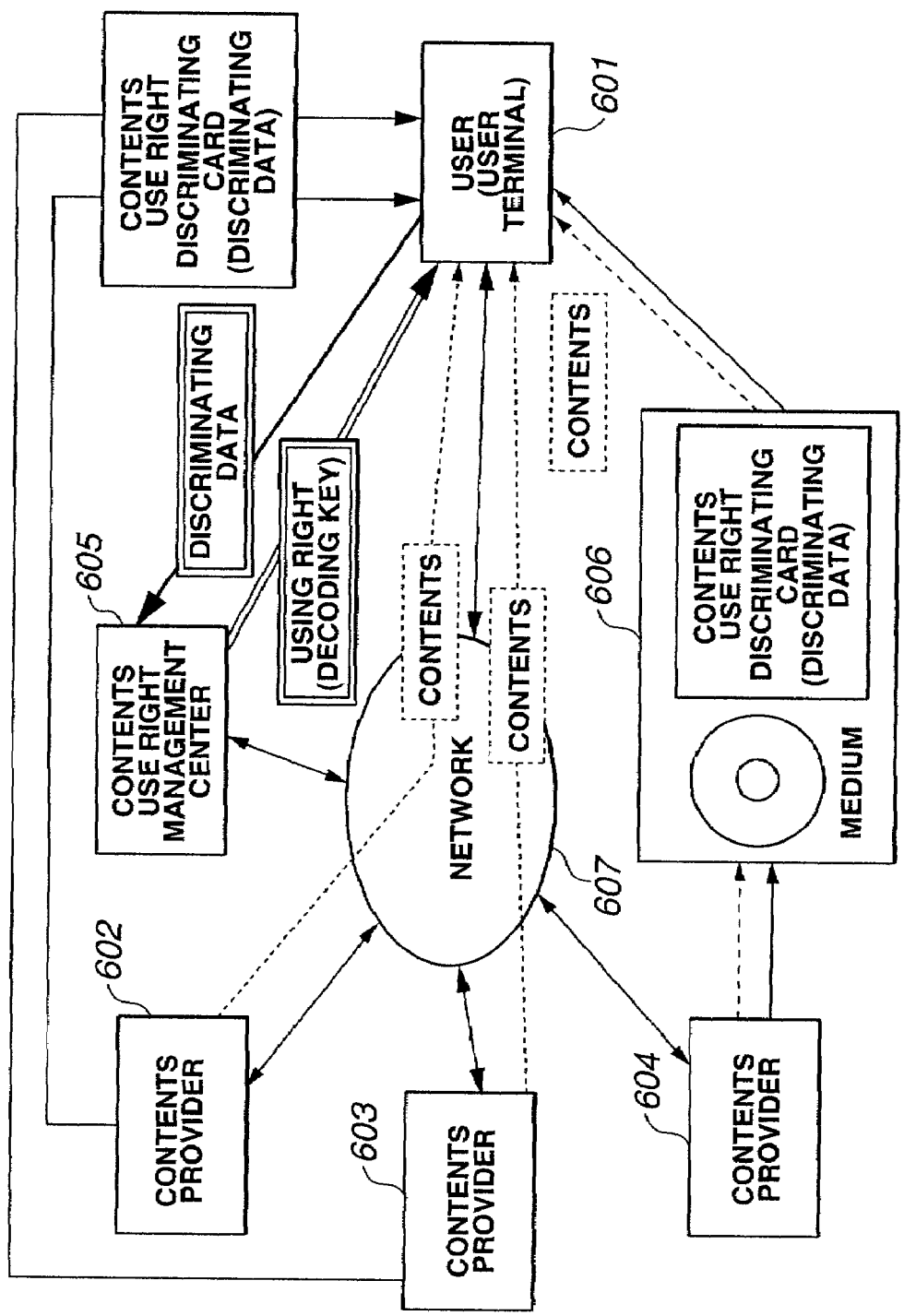
FIG. 3 is a diagram illustrating the circulation of content in the information transaction system of the present invention as well as the circulation of the content use rights discrimination card.

FIG. 3 illustrates a user terminal, a content provider, and the circulation of the content, content use rights discrimination cards and the content use rights in which content keys are used as decoding keys.

In FIG. 3, a user operates user terminal 601, which may be a recording and/or reproducing unit as explained, for example, by referring to FIG. 2. The user terminal 601 may alternatively be a terminal installed in a personal computer or in game equipment, may be owned by the user or located at a common space, such as at a railway station or a convenience store, and used by unidentified users in the public at large.

A user who desires access to various content, such as music, pictures, or game programs, utilizes the user terminal 601 to have encrypted content distributed from content providers 602 to 604 via the network or to acquire the content stored in a storage medium 606. The content purchaser buys and receives the content use rights discrimination card when the purchaser acquires the content.

On the content use rights discrimination card is recorded the identifiers necessary to acquire the decoding key of the encrypted content. If the distribution route of the encrypted content is by accessing a storage medium, such as a DVD or a CD, the content use rights discrimination card is packaged with the medium. By contrast, if the encrypted content is distributed over the network, the content use rights discrimination cards are distributed or sold independently. As a further alternative, when the content is distributed through a medium, the content use rights discrimination cards are distributed or sold independently and not packaged with the medium. For any of these cases, the content use rights discrimination cards are distributed or sold sealed or as a scratch-off pad, so that the identifier data cannot be observed from outside.

The content providers 602 to 604, who provide the encrypted content to the user, collect the content use fee when providing of the content use rights discrimination card to the users, thereby avoiding on-line fee collection from the users. Meanwhile, the assignment of the counter-values responsive to the providing of the content use rights discrimination card to the users may be suitably made among the content providers, the content use rights sale center and even the retail stores, etc., which have sold the content use rights discrimination card.

FIG. 4 shows an example of the identification data that is recorded on the content use rights discrimination card, namely a content identifier (ID) for discriminating the content to be used, one or more serial numbers and an electronic signature. The content identifier (ID) is used to determine the content to be used that has been purchased from the from the content providers. The serial numbers are for identifying the respective content use rights discrimination cards. The electronic signature is executed by an organization that issues or supervises the content use rights discrimination cards. The electronic signature serves as check data. Alternatively, the electronic signature is not used and simplified check data, such as a check sum is afforded in its stead.

Reverting back to FIG. 3, the circulation of content, the content use rights discrimination cards and the content use rights, i.e., the decoding keys, among the user terminals, content providers and the content use rights sale center is explained.

The user, at user terminal 601, purchases and receives the content use rights discrimination card, configured as explained with reference to FIG. 4, together with the medium 606 or via a separate route.

The user then sends the identification data recorded on the content use rights discrimination card to the content use rights sale center 605 via a network 607.

The content use rights sale center 605 manages the information pertinent to the issued content use rights discrimination card in its database and also manages data indicating whether or not a decoding key for the content associated with the content use rights discrimination card that is identified by the serial number has already been distributed. The content use rights sale center 605 determines whether or not the identification data, recorded on the content use rights discrimination card received from the user is authentic.

If, after checking for the above items, the content use rights sale center 605 determines that content use rights is to be issued to the user, the decoding key is distributed to the user. The content key is preferably sent in an encrypted form using the session key co-owned after reciprocal authentication processing with the user terminal. The user receives the key and decodes the encrypted content key received with the session key to execute the decoding processing of the encrypted content.

FIG. 5 shows a database for storing the content use rights discrimination card data within the content use rights sale center 605. The database stores information such as the content identifier (ID) for discriminating the content, serial numbers, the number of sales of the use rights (or of the decoding keys) or the information on the purchasers of the use rights. The content identifier (ID) and the serial numbers correspond to data in the content use rights discrimination card explained above with reference to FIG. 4. The number of sales of the use rights represents the number of sales of the use rights when the content use rights discrimination card is repeatedly resold. The purchaser information represents the identification data of the purchasers including where re-sale of the content use rights discrimination card is permitted and, when permitted, the number of times of re-sale.

In FIG. 5, the upper two rows denote content use rights discrimination cards that can be re-sold, the two middle rows represent content use rights discrimination cards that cannot be re-sold, and the two lower rows indicate the content use rights discrimination cards that can be re-sold up to a preset maximum number of times.

Figure 6:
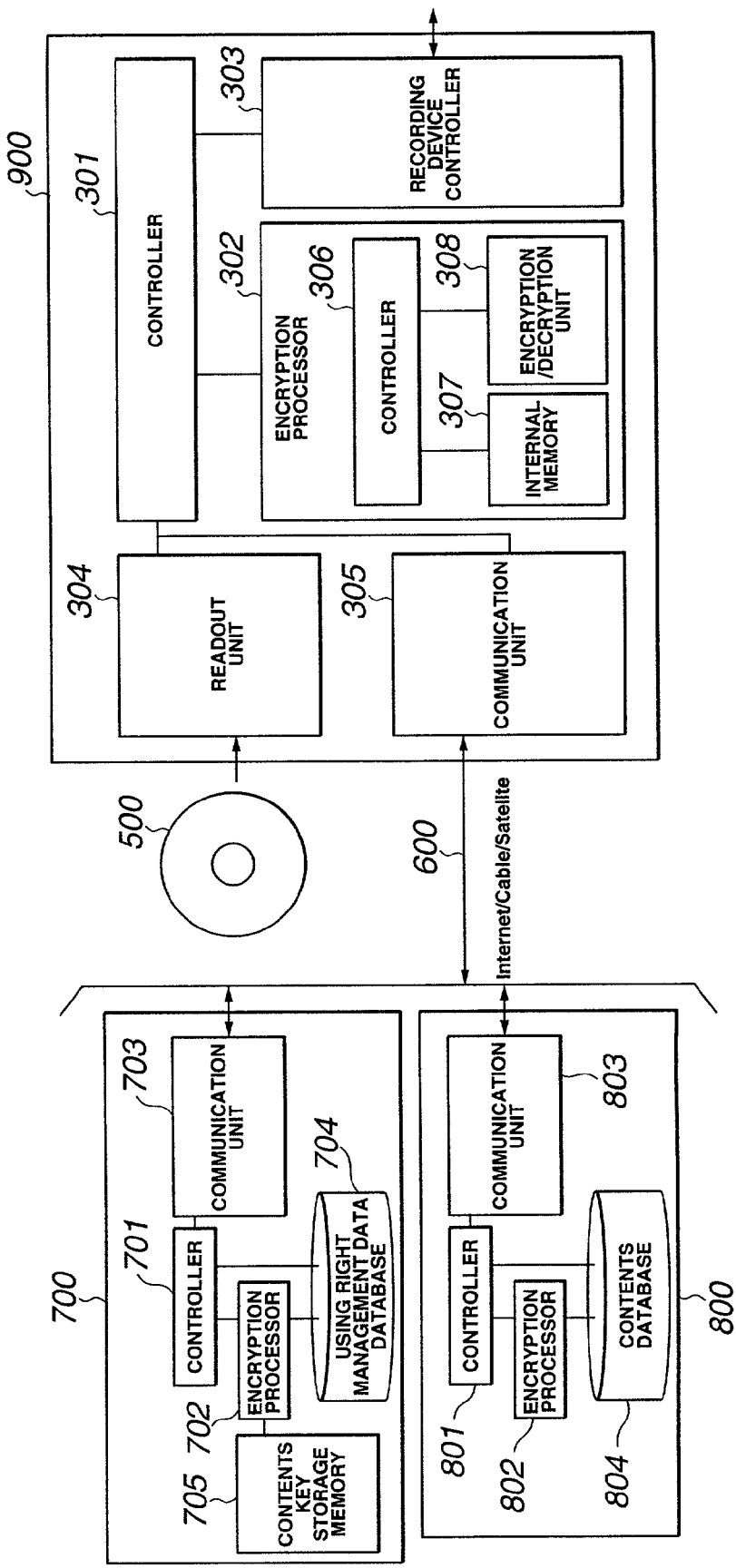
FIG. 6 is a block diagram illustrating the structure of a user terminal, content use rights sale center and a content provider in the information transaction system of the present invention.

FIG. 6 is a block diagram showing the content use rights sale center, the content providers and the user terminals that form the information transaction system of the invention. A user terminal 900 is similar to the recording and/or reproducing unit 300 that is explained with reference to FIG. 2, and like reference numerals depict the same components.

A content use rights management center 700 includes a communication unit 703 for communicating with a user terminal 900, a controller 701 for exercising overall control including communication control, a cipher processor 702 for controlling cipher processing, a database 704 for holding management data of the content use rights discrimination cards explained in connection with FIG. 5, and a content key storage memory 705 for holding the content key used for decoding the content. The cipher processor 702 executes reciprocal authentication processing of the user terminal 900, executes session key generation and executes content encryption using the session key.

A content provider 800 is configured to supply encrypted content to the user using a storage medium 500 or via a communication means 600, such as a network, and is comprised of a content database 804, a cipher processor 802 for encrypting the content, a communication unit 803 for communicating with the user terminal, and a controller 801 for executing comprehensive control including communication control. The structure of the content provider 900 is merely illustrative. For example, if the provider supplies only the medium, no communication means is required.

Although the content management center and the content provider are shown in FIG. 6 as independent systems, the functions of the content management center and the content provider may instead be provided by a combined system.

The processing operations executed by the configuration of FIG. 6 is now explained in greater detail. First, the content use rights discrimination card, described in FIG. 4, is created by the content use rights management center 700 in association with the distribution of the content from the content provider 800. The content use rights management center 700 supplies a content identifier to the newly distributed content, supplies a serial number to each content use rights discrimination card issued, and generates electronic signatures for these content identifiers and the serial numbers for the content use rights discrimination cards.

In place of the content use rights management center 700, the content provider may prepare the content use rights discrimination card and provide information on the content use rights discrimination card so that subsequent use rights distribution will be handled by the content use rights management center 700.

A typical method for generating the electronic signature data which employs DES in the common key encryption system is hereinafter explained. Alternatively, a fast encipherment algorithm (FEAL) used by NTT or an advanced encryption standard (AES), which is the next generation standard cipher used in the United States, may be used in place of DES in the common key encryption system.

Figure 7:
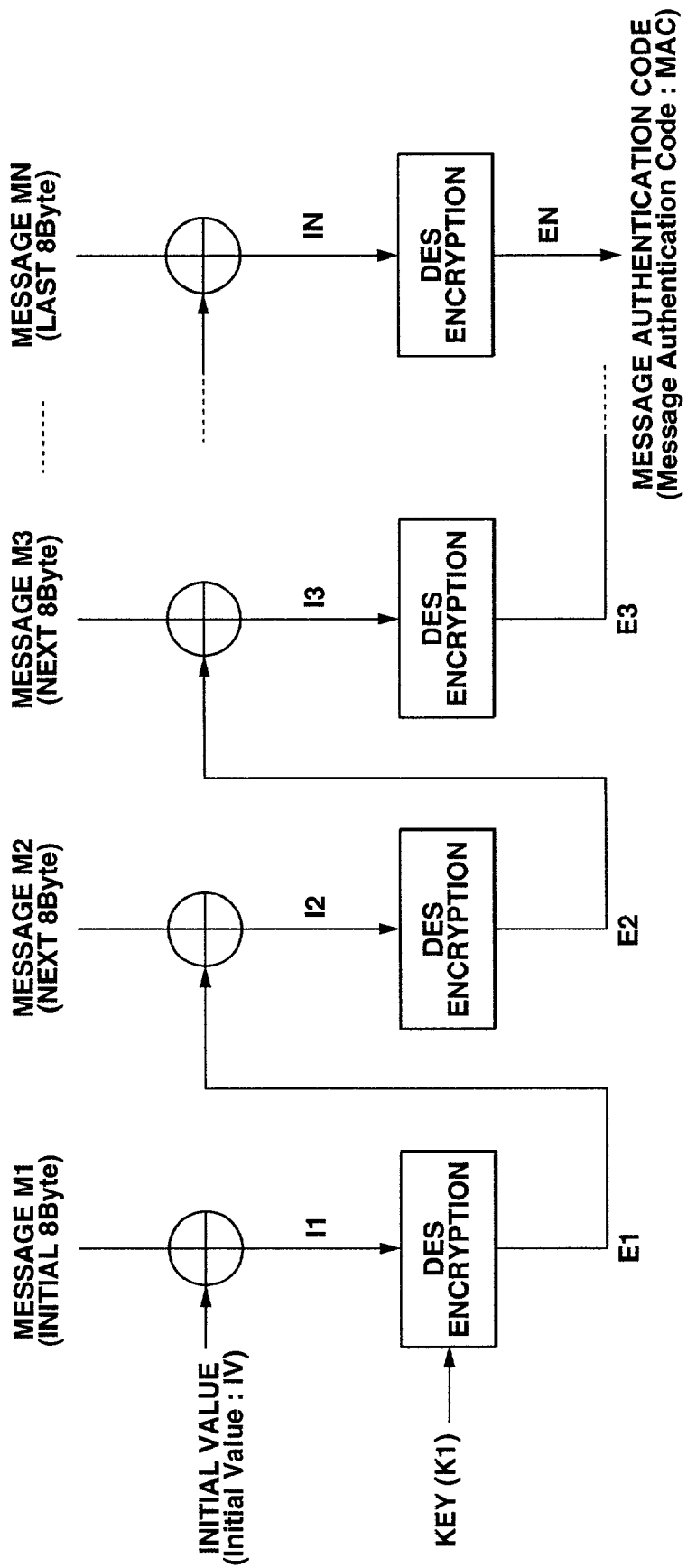
FIG. 7 illustrates the steps of signature generation for the content use rights discrimination card of the information transaction system of the present invention.

Referring to FIG. 7, a method for generating an electronic signature using a DES routine is explained. First, a message for which an electronic signature is to be generated is divided into portions of 8 bytes each, which are designated M2, ..., MN. An initial value IV is exclusive-ORed with the portion M1 to generate a result 12 that is supplied to a DES encryption unit. The result 12 is then encrypted using a key K1 to generate an output E1. The output E1 is then exclusive-ORed with the portion M2 to form an output 12 which is fed to the DES encryption unit where it is encrypted using the key K1 to generate an output E2. The above sequence of operations is repeated to encrypt all of the message portions until the final result EN, which represents the electronic signature, is generated. The value EN is known as a message authentication code (MAC) and is used to check for possible message counterfeiting. The linking to the encrypted message is referred to as cipher block chaining (CBC). To verify the MAC value, the operator generates a MAC value in the manner and if the two values coincide, verification is successful.

The content use rights discrimination card stores the content ID and the serial number that are associated with the message being verified. An electronic signature is generated from this data or using data derived from the data and is used as a message to be input to the DES cipher processor shown in FIG. 7.

Figure 8:
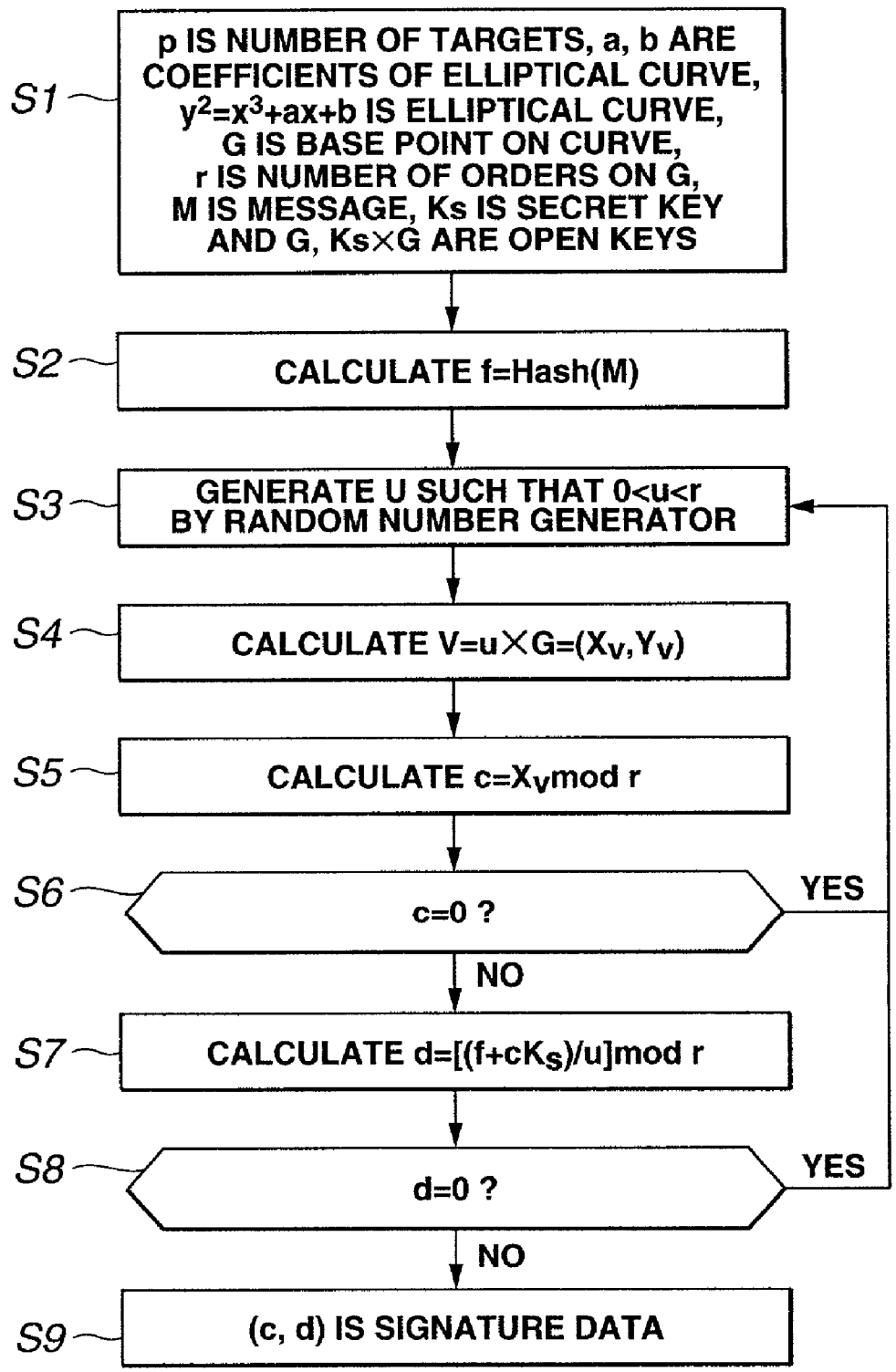
FIG. 8 is a flowchart further illustrating the steps of signature generation for the content use rights discrimination card of the information transaction system of the present invention.

The generation of an electronic signature using the open key encryption system is now explained with reference to FIG. 8. The processing shown employs an elliptic curve digital signature algorithm (EC-DSA) according to the IEEE P1363/D3 standard. Here, elliptic curve cryptography (ECC) is used, through an RSA code (Rivest, Shamir, Adleman, ANSI X9.31) may also be used.

At step S1, p is defined as the number of marks, a and b as coefficients of the elliptical curve $y2=x3+ax+b$, G as a base point on the elliptical curve, r as the number of orders of G, and Ks as a secret key, where $0<Ks<r$. At step S2, a hash value of the message M is calculated where f=Hash (M).

The Hash function compresses a message to a data value of a pre-set bit length and is output as the hash value. The hash function has the feature that the value input is difficult to determine from the hash value or output. Further, if one bit of the input data supplied to the hash function is changed, then many bits in the hash value are changed, so that it is difficult to find different input data having the same hash value. The hash function may be an MD4, MD5, SHA-1 or DES-CBC function. In such a case, the MAC value, namely the check value corresponding to ICV as the ultimate output value, represents the hash value.

Then, as shown at step S3, a random number u, where $0<u<r$, is generated and, as shown at step S4, a coordinate corresponding to the base point tomes u (Xv, Yv) is calculated. Also, addition and multiplication by 2 on the elliptical curve are defined as follows:

When P=(Xa, Ya), Q=(Xb, Yb), R=(Xc, Yc)=P+Q, and if P≠0, i.e., addition:

$Xc=\lambda 2-Xa-Xb,$ $Yc=\lambda \times (Xa-Xc)-Ya$, and $\lambda =(Yb-Ya)/(Xb-Xa).$ Whereas, if P=Q, namely multiplication by 2:

$Xc=\lambda 2-2Xa,$ $Yc=\lambda \times (Xa-Xc)-Ya$, and $\lambda =(3(Xa)2+a)/(2Ya).$ Using these functions, the point G times u is calculated. Although the operating speed is low, the calculating method which is easiest to understand is as follows: G, 2×G, 4×G, ... are calculated and u is expanded into a binary number and 2i×G, namely G multiplied by 2i, is added to 1 in the resulting binary number, where i is the bit position of u as counted from its LSB.

Then, at step S5, c=Xvmod r is calculated and, at step S6, it is verified whether or not this value is 0. If the value is not 0, d=[(f+cKs)/u] mod r is calculated at step S7. Then, at step S8, it is checked whether or not the value d is 0. If the value d is not 0, then the values c and d are output as electronic signature data. If the value r is of a 16-bit length, the electronic signature data is 320 bits long.

If the value is c=0 at step S6, then the processing reverts to step S3 to re-generate a new random number. Similarly, if the value is d=0 at step S8, processing reverts to step S3 to re-generate a random number.

Figure 9:
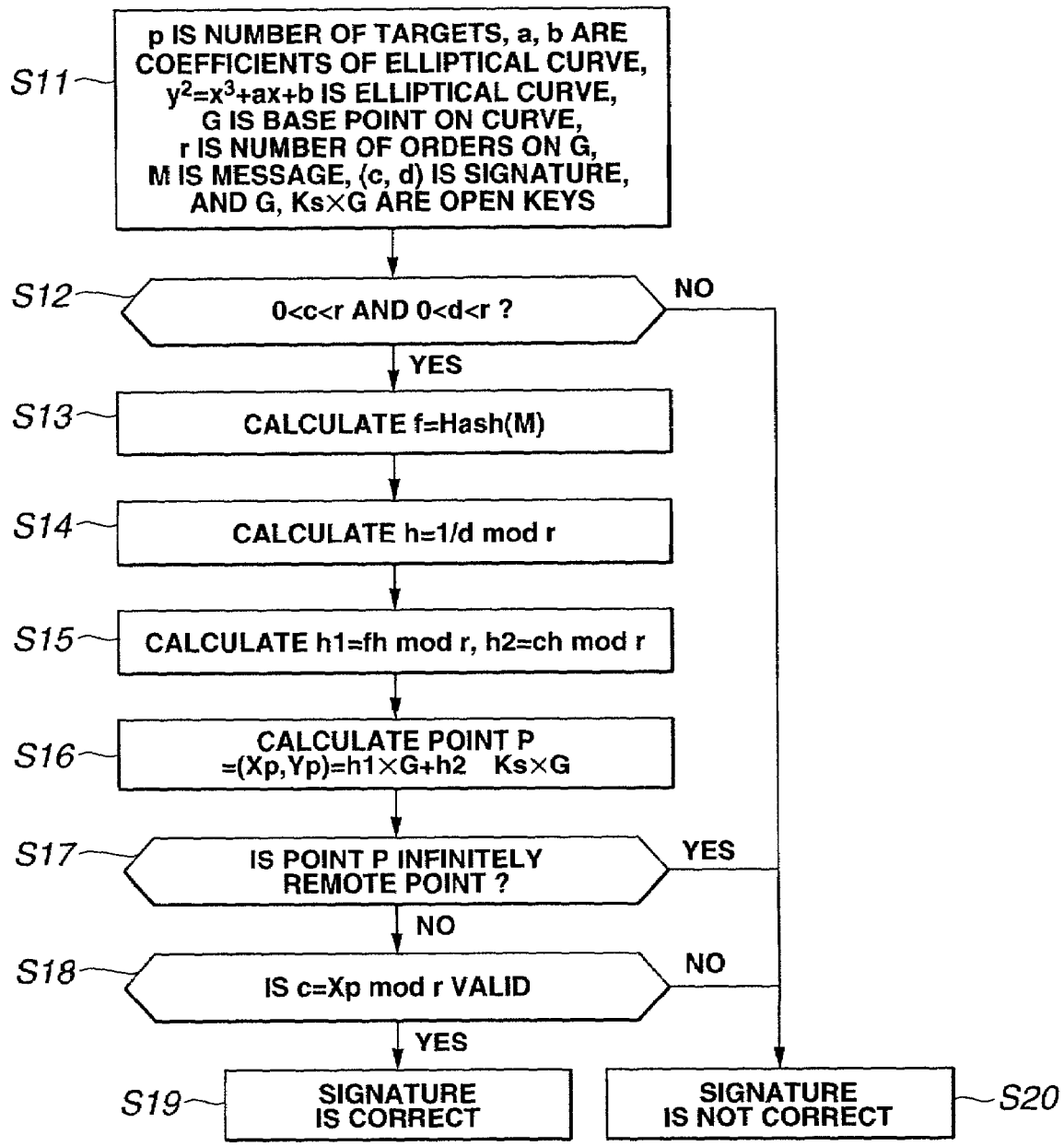
FIG. 9 is a flowchart illustrating the steps of signature verification of the content use rights discrimination card of the information transaction system of the present invention.

The method for verifying the electronic signature using the open key encryption system is explained with reference to FIG. 9. At step S11, M is defined as a message, p is the number of marks, a and b are coefficients of the elliptical curve $y2=x3+ax+b$, G is a base point on the elliptical curve, r is the number of orders of G, and Ks×G is a secret key, where $0<Ks<r$. At step S12, it is verified whether or not the electronic signature data c and d meet the conditions $0<c<r$ and $0<d<r$. If the conditions are met, the hash value of the message M is calculated at step S13 to set f=Hash (M). Then, h=1/d mod r is calculated, at step S14, and, at step S15, h1=fh mod r and h2=ch mod r are calculated.

At step S16, h1 and h2, which are previously calculated, are used to calculate a point P=(Xp, Yp)=h1×G+h2·Ks×G. The electronic signature verifier knows the values of the open key G, and the Ks×G scalar-multiplied values of points on the elliptical curve can be calculated in the same manner as at step S4 of FIG. 8. At step S17, the system checks whether or not the point P is a point approaching infinity. If the point P is not a point near infinity, processing transfers to step S18. The decision as to whether the point P is or is not a point at infinity may be made at step S16. That is, if the point P=(X, Y) is summed to the point Q (X, −Y), then λ cannot be calculated, meaning that P+Q is at infinity. At step S18, Xp mod r is calculated and compared to the electronic signature c. If this value is coincident, processing transfers to step S19 to verify that the electronic signature is correct.

If the electronic signature is found to be correct, then the data is not counterfeit, and thus the owner of the secret key for the open key has generated the electronic signature.

If, at step S12, the electronic signature data does not meet the conditions that 0<c<r and 0<d<r, processing transfers to step S20. Further, if at step S17, the point P is at infinity, processing similarly transfers to step S20. Moreover, if at step S18, the value of Xp mod r is not coincident with the electronic signature data c, processing likewise transfers to step S20.

If, at step S20, the electronic signature is found not to be correct, then the data has been counterfeited or the person who generated the electronic signature is not the owner of the secret key for the open key.

An electronic signature is prepared by the content use rights management center 700 or by the content provider 800 and is verified by the content use rights management center. When the electronic signature is prepared by the content provider 800 and verified by the content use rights management center 700, the content use rights management center is configured to hold a key for verification of the electronic signature that is matched to the content provider 800 that prepared the signature.

Referring back to FIG. 6, the procedure of distributing the content use rights is further explained. The user terminal 900 acquires content or transmits identification data that is recorded on the content use rights discrimination card, which is purchased through a separate route, to the content use rights management center 700 over the communication means 600. The content use rights management center 700 verifies the signature on the data of the content use rights discrimination card using the technique described above to check for counterfeiting.

After verifying that the data has not been counterfeited, the content use rights management center 700 extracts, from the database 704, the data coincident with the content ID and the serial number in the identification data sent from the user, as shown in FIG. 5. If the number of times of sale of corresponding data is zero, then the use rights, i.e., the content key, has not as yet been distributed, that is the impending distribution is the first distribution. Thus, the content key is taken out from the content key storage memory 705 and transmitted to the user. Preferably, the content key is transmitted in the encrypted form. The number of times of sale of corresponding data is set to "1" in the database 704 at the same time that the content key is transmitted to the user.

Meanwhile, the content key is, preferably, transmitted from the content use rights management center 700 to the user terminal 900 after encrypting the content key in the cipher processor 702 to provide safe communication over the network. To encrypt the content key, encryption may be employed using a common key in accordance with a common key encryption method, using a secret key of the content use rights management center, or using a session key generated by reciprocal authentication processing with the content use rights management center 700.

Figure 10:
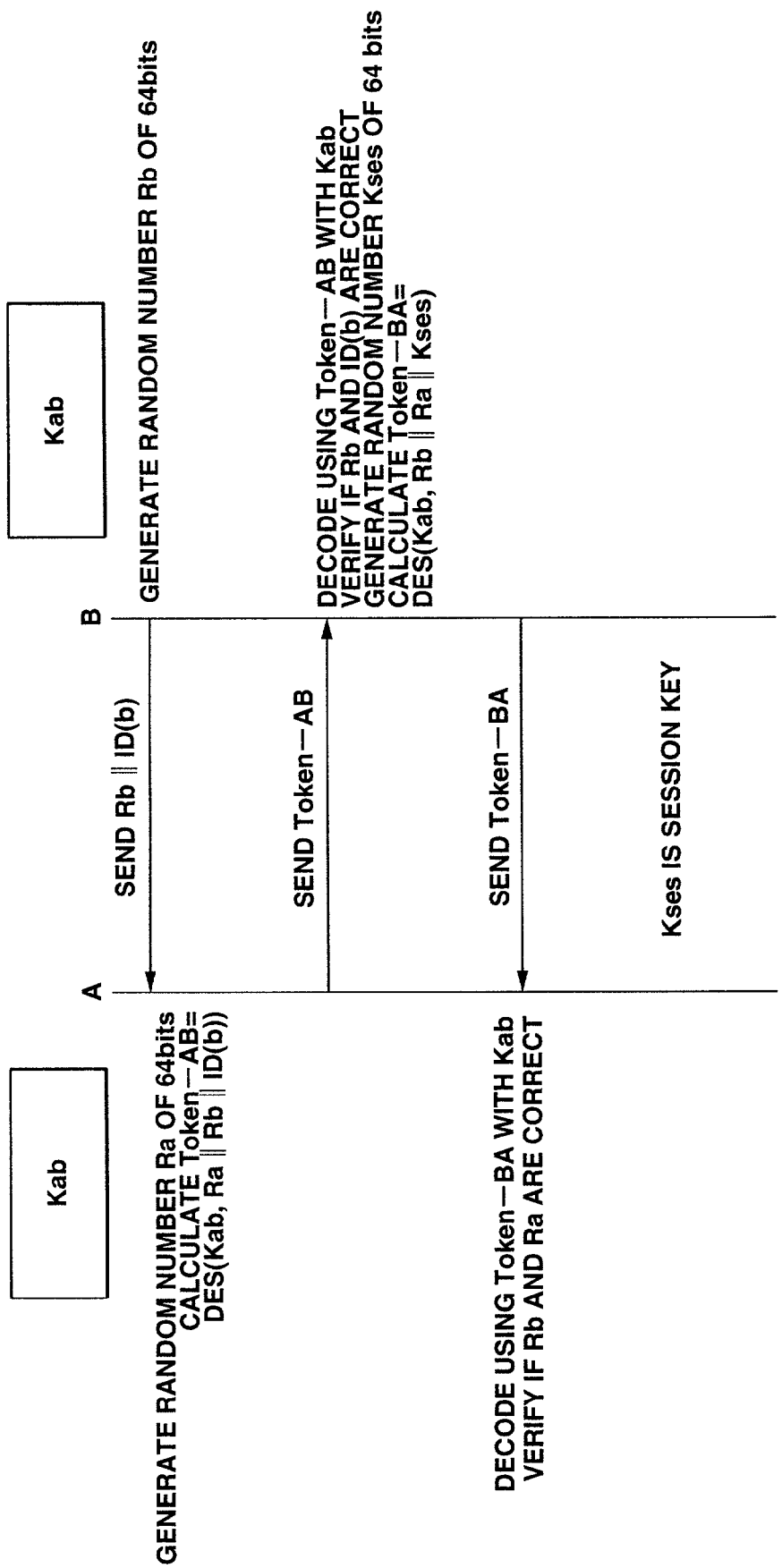
FIG. 10 is a diagram illustrating reciprocal authentication processing in the information transaction system of the present invention.

Reciprocal authentication processing employing common key encryption is explained with reference to FIG. 10. Although DES is typically the common key encryption method, any suitable common key encryption method may be used. In FIG. 10, one of systems A and B corresponds to the user terminal 900 in FIG. 6, and the other one corresponds to the content use rights management center 700.

First, system B generates a 64-bit random number Rb and transmits the number Rb and a value ID(b) as its identifier to system A. On receipt of the transmitted data, system A generates a new 64-bit random number Ra and encrypts the data in the order of the numbers Ra, Rb and ID(b) in the CBC mode of the DES using a key Kab to return encrypted data to system B. For the CBC mode processing configuration of DES shown in FIG. 7, number Ra corresponds to value M1, number Rb corresponds to value M2 and number ID(b) corresponds to value M3, with the outputs E1, E2 and E3 for the initial value IV=0 being the cipher text.

On receipt of the cipher text, the system B decodes the cipher text using the key Kab. The cipher text E1 is decoded with the key Kab to obtain a random number Ra, the cipher text E2 is then decoded with the key Kab and the result is exclusive-ORed with the cipher text E1 to obtain a random number Rb, and then the cipher text E3 is decoded with the key Kab and the result is exclusive-ORed with E2 to obtain value (ID)b. Number Rb and value ID(b) are verified to determine whether the values system coincide with the data transmitted by system B. If the data passes verification, system B authenticates system A as being a valid system.

Then, system B generates a session key Kses by a method employing random numbers. Random numbers Rb, Ra and key Kses are encrypted, in this order, in the CBC mode of DES, to return the encrypted data to system A.

On receipt of the returned data, system A decodes the data using the key Kab. The method used for decoding the received data is similar to that used for decoding processing by system B. Numbers Rb and Ra are then verified as to whether or not these values coincide with the data transmitted by system A. If the data passes verification, system A then authenticates system B as being a valid system. After reciprocal authentication is completed, the session key Kses is used as a common key for all confidential communication.

If, while in verifying the received data, a non-coincidence is found, processing is discontinued based on that the reciprocal authentication has failed.

Reciprocal authentication employing the 160 bit long, elliptical ElGamar cipher as an open key encryption system is explained with reference to FIG. 11. Although ECC is used, other suitable open key encryption systems may be used. Also, the key size need not be 160 bits.

Figure 11:
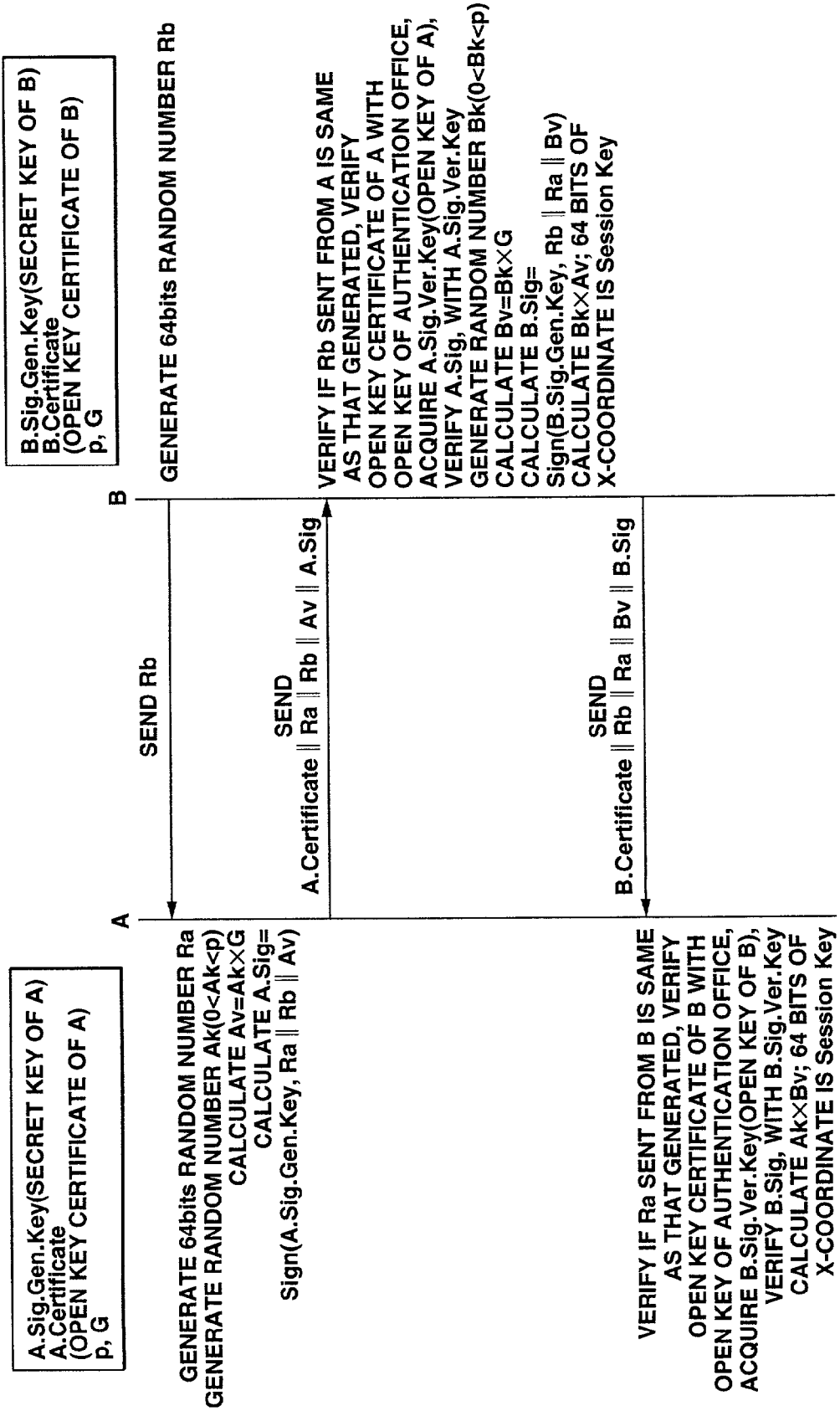
FIG. 11 is a diagram further illustrating reciprocal authentication processing in the information transaction system of the present invention.

In FIG. 11, system B first generates a 6-bit random number Rb to transmit to system A. On receipt of the transmitted data, system A generates a new 64-bit random number Ra and a random number Ak that is less than the number of marks p. A point obtained on Ak multiplying the base point G, or a point Av=Ak×G, is determined, and an electronic signature A.Sig for numbers Ra, Rb and point Av (using X- and Y-coordinates) is generated and returned to system B together with the open key certificate of system A. Because numbers Ra and Rb are each 64 bits long and the X- and Y-coordinates of point Av are each 160 bits, an electronic signature of 448 bits is generated. The method for generating the electronic signature is explained with reference to FIG. 8.

The open key certificate is issued by the Certificate Authority (CA) in the open key encryption system when the user submits the user's ID and the open key. The Certificate Authority then appends the ID of the Certificate Authority as well as the information on the term of its validity and the signature of the Authority.

Figure 12:
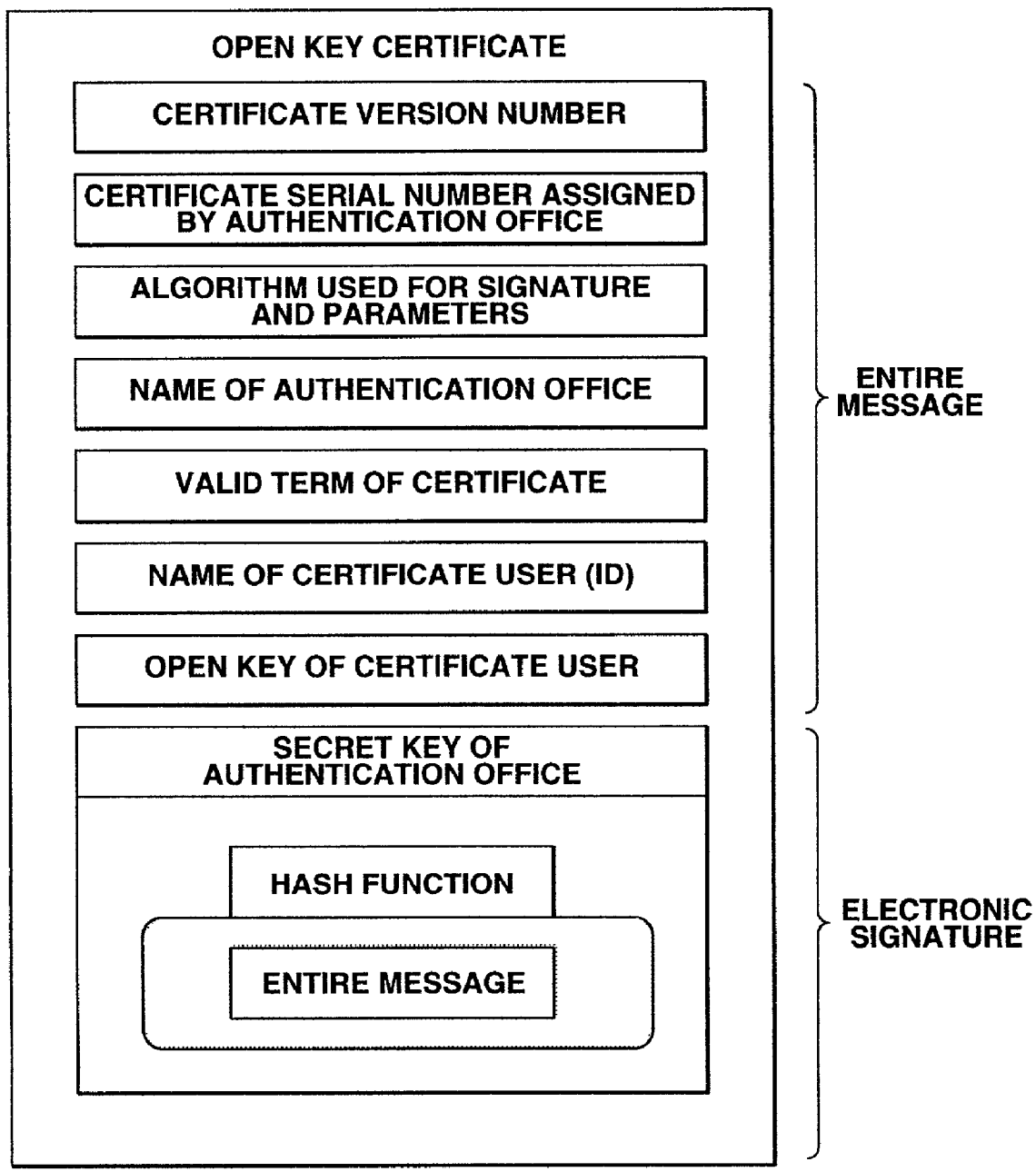
FIG. 12 is a diagram illustrating the structure of an open key certificate used for the reciprocal authentication processing in the information transaction system of the present invention.

A typical open key certificate is shown in FIG. 12. The certificate includes a version number of the certificate, a serial number of the certificate assigned by the Authority to the certificate user, an algorithm and the parameters used in the electronic signature, the name of the Authority, the term for the validity of the certificate, the name of the certificate user and the open key and the electronic signature of certificate user.

The electronic signature is generated using a hash function based on the serial number of the certificate that is assigned by the Authority to the certificate user, as well as based on an algorithm and parameters used in the electronic signature, the name of the Authority, the term of validity of the certificate, the name and the open key of the certificate user to generate the hash function, and by applying the secret key of the Authority to the hash value. The process flow is similar to the example shown in FIG. 6.

If the Authority that issued the open key certificate, while updating the open key certificate, determines that the term of validity has lapsed, the Authority prepares, supervises and distributes a list of unauthorized users to exclude the users who made illicit acts. This operation is known as revocation. The Authority also generates open and secret keys as necessary.

Alternatively, if the open key certificate is valid, the user applies the open key of the Authority, verifies the electronic signature of the open key certificate and then removes the open key from the open key certificate after successful verification. Consequently, the users who exploit the open key certificate must own the open key of the common authentication office. The method for verifying the electronic signature is explained above with reference to FIG. 9.

Referring back to FIG. 11, system B who has received the open key certificate, as well as numbers Ra, Rb, Av and the electronic signature of system A, verifies whether or not the number Rb transmitted from system A coincides with those generated by system B. If the results indicate coincidence, system B verifies the electronic signature in the open key certificate of system A, using the open key of the authentication office, to take out the open key of system A. Using the open key of system A thus taken out, system B verifies the electronic signature A.Sig. The method for verifying the electronic signature is explained above with reference to FIG. 9. After successful verification of the electronic signature, system B authorizes system A as being valid.

Then, system B generates a random number smaller than the target number p. System B next finds a point Bv=Bk×G, corresponding to the base point G times the value Bk, to generate the electronic signature B.Sig for values Rb, Ra and By (using X- and Y-coordinates) to return the generated electronic signature to system A along with the open key certificate of system B.

System A, after receiving the open key certificate of system B, the numbers Rb, Ra, By and the electronic signature of system B, verifies whether or not the value Ra transmitted from system B coincides with that generated by system A. In case of coincidence, system A verifies whether or not the value Ra that is transmitted from system B coincides with that generated by system A. In case of coincidence, system A verifies the electronic signature in the open key certificate of the authentication office to take out the open key of system B. Using the open key of the authentication office, system A verifies the electronic signature in the open key certificate of system B to take out the open key certificate of system B. Successfully verifying the electronic signature, system A authorizes system B as being valid.

If both systems A and B are successful in authentication, system B calculates the value Bk×Av, while system A calculates the value Ak×Bv using one lower 64 bits of the X-coordinate of these points as a session key in the subsequent communication. A scalar number times the point on an elliptical curve is required since the value Av is a point on the elliptical curve although the value Bk is a random number. Meanwhile, it is assumed that the common key cipher is of 64 bit key length. Of course, the session key may be generated from the Y-coordinate with the lower 64 bits being not essential. In secret communication following reciprocal authentication, the transmission data is not only encrypted with the session key but also an electronic signature may be appended thereto.

If, at the time of verification of the electronic signature or reception data, illicitness or non-coincidence has been found, the processing is aborted on the assumption that the reciprocal authentication has resulted in failure.

In the above-described reciprocal authentication, the content use rights sale center 700 encrypts the content key, using the generated session key, to send the encrypted content key to the user terminal 900.

The user terminal 900, which has received the encrypted content key, executes decode processing of the content key, using the session key generated at the time of authentication processing by the cipher processor 302. The content key, obtained by the decode processing, is used to decode the content recorded on the content use rights identification card, that is, the encrypted content received via the medium 500 or the communication means 600. The user utilizes this content key to decode the encrypted content into usable data.

In the transaction system and method of the present invention, there is no necessity for, e.g., the content provider or the content distributors to construct an on-line settlement system with a credit card or a bank account designation. On the contrary, the content provider or the content distributors are able to recover the content user fee for the sale of the content use rights through circulation of the content use rights identification card, thus facilitating the utilization of the content by a user who does not have a credit card nor a bank account.

In the foregoing description, it is assumed that the content provider executes lumped preparation and distribution of the content. Alternatively, the content provider may prepare the content, in which case the service provider who delivers the content purveyed from the content provider performs encryption and distribution services of content that is prepared by the content provider, namely the procedure shown at 4 in FIG. 13.

[Resale of Content use Rights.]

In the above explanation, the distribution of the content key based on the content use rights identification card is performed only once and for all users. However, the content use rights identification card of the information transaction system and the method of the present invention also permit the transfer of the same content use rights identification card from the user who acquired the card to others. The other users to whom the card has been assigned acquire the content key from the content use rights management center based on the content use rights identification card. This configuration is now explained.

Figure 13:
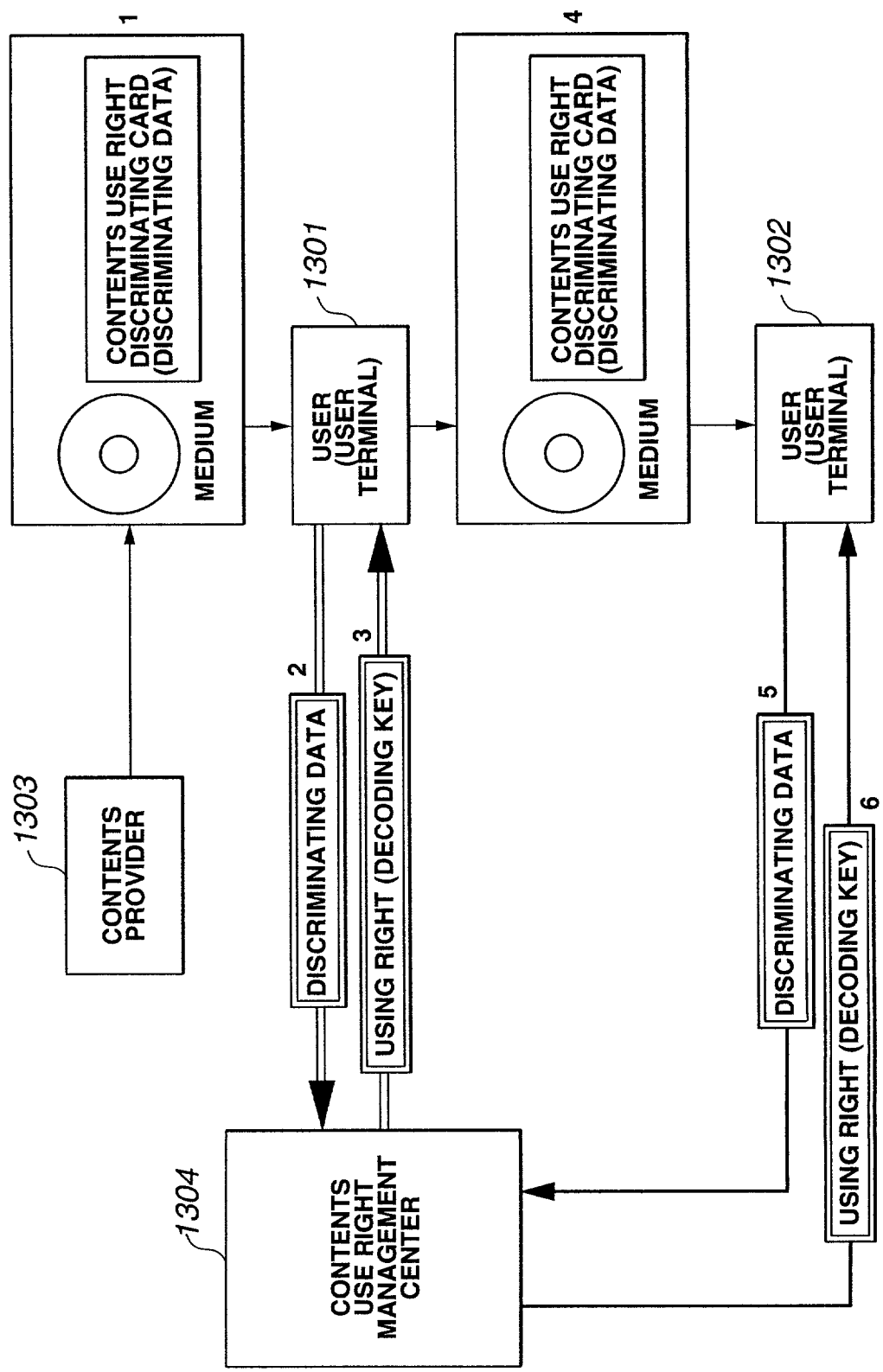
FIG. 13 is a diagram illustrating the re-sale of the content use rights discrimination card of the information transaction system of the present invention.

FIG. 13 shows a configuration in which a content use rights identification card is transferred among users and in which different users acquire the content key based on the same content use rights identification card. In FIG. 13, a user (using a user terminal) 1301 acquires encrypted content from a content provider 1303 as a purchase of a content use rights identification card, shown as procedure 1 in FIG. 13.

The user 1301 transmits the identification data of the content use rights identification card to a content use rights management center 1304 (procedure 2), in accordance with the aforementioned procedure, to accept the content key (procedure 3) and decode the content for use. The user 1301 assigns the medium in which the encrypted content have been stored and the content use rights identification card to a further user (using a further user terminal) 1302.

The user 1301 transmits the identification data of the content use rights identification card assigned thereto to the content use rights management center 1304 (procedure 5) to receive the content key (procedure 6) to decode and utilize the content.

Meanwhile, from the user 1302, the content use fee in this case may be collected by a conventional credit card and charge recovery by the bank account designation. Alternatively, of the content use rights identification card may be priced according to the number of times of possible resale which is stored in the content use rights identification card when sold to the first user. For example, if the price of a content use rights identification card that cannot be resold, that is the price of a content use rights identification card that can acquire a single content key, is $1.00, the price of the content use rights identification card that can be resold once, that is the price of a content use rights identification card that can acquire a content key twice inclusive of the initial key acquisition, is $2.00, and the price of a content use rights identification card which is able to acquire the content key three times inclusive of the initial key acquisition is $3.00, then the user to whom the content use rights identification card has been transferred need not take an on-line settlement procedure. It should be noted that a card having the right to acquire the content key plural times may be sold at a discount price.

The content use rights sale center 1304 supervises the information on the possible resale of the content use rights identification cards using the database of the content use rights management center explained above with reference to FIG. 5. Serial numbers are afforded to the issued content use rights identification cards for identifying the respective cards and, for each of these cards, the possibility of re-sale and the maximum number of resales N are set. In FIG. 5, the cards shown in the two upper rows cannot be resold, that is, these cards can acquire the content key only once. The content use rights identification cards of the two middle rows may be resold without limitation of the number of times of resale. The lower two cards are set to a predefined number of times of possible resale equal to N so that it is possible to acquire the content key up to N times from the content use rights sale center 1304.

Upon receipt of the content use rights identification card from the user, the content use rights sale center 1304 extracts the corresponding data from the database shown in FIG. 5 to determine whether or not to transmit the content key depending on the setting information. For example, if the key received is for a content use rights identification card set capable of acquiring the content key up to N times from the content use rights sale center 1304, the number of times of resale is checked and the content key is transmitted up to a number of times not exceeding N. When the content use rights sale center 1304 transmits the content key, it increments the number of times of sale in the database by 1.

Moreover, the purchaser information is recorded in the data shown in FIG. 5, such that the content use rights sale center 1304 registers the information of the user who first purchased the content use rights identification card, in association with its serial number, such that when a request for purchasing the content a plural number of times is received based on the content use rights identification card, the content use rights sale center 1304 accords points corresponding to the number of times of purchase to offer discounting of the pricing of the content or the pricing of the content use rights identification card, depending on the number of points.

The serial number accorded to the content use rights identification card is preferably not distributed from one circulation channel to another. In this configuration, the circulating channel can be determined based on the serial number to prevent the circulation of content use rights identification card bearing the illicit serial numbers.

If the content use rights sale center 1304 has the user identity decision information or the user equipment information as management data, the content use rights sale center 1304 accords points for use by the same user or for repeated requests of the acquisition of the content key from the same equipment.

An exemplary structure of the database is shown in FIG. 14. The database includes, e.g., a content identifiers (ID) for identifying the content to be used, a serial number, a number of times of sale of the use rights or of the decoding key, information on the purchasers of the use rights and the user equipment identification. The content identifiers (ID), serial number, number of times of sale of the use rights (or decoding key), information on the purchasers of the use rights, and so forth, are similar to those explained with reference to FIG. 5.

The user identification data is acquired from the user who transmitted the content use rights identification card data. For example, biometric information and other data about the user, such as the user ID plus a password, a fingerprint, an iris image or voice print is registered and is received at the time of receipt of the content use rights identification card of the user by the content use rights sale center 1304 to verify the user's identity and to accord the points for the user when used by the same user.

The user equipment identification data may be configured so that an ID of the equipment being operated by a user is registered and, if a request is from the same user equipment when acquiring the content key, repeated transmission of the content key is allowed. The decision as to whether the identity of the user equipment may be executed is carried on by the reciprocal authentication shown in FIGS. 10 and 11.

Although the present invention has been elucidated by referring to its specified embodiment, it is obvious that those skilled in the art can make correction or substitution of the embodiment without departing from the scope of the invention. That is, the forgoing description of the present invention is merely for the sake of illustration and should not be construed to limit the present invention. For verifying the scope of the present invention, reference should be made to the description of the claims.

INDUSTRIAL APPLICABILITY

With the information transaction system and method according to the present invention, it is unnecessary for content providers or content distributors to construct an on-line settlement system using credit cards or bank accounts. On the other hand, the same content use rights identification cards may be transferred between the users, while the content key can be received plural times based on the same identification to accelerate content utilization. The content provider or the content distributor is able to recover the content use fee as the sale fee of the content use rights identification card through the circulation route of the content use rights identification card. This procedure facilitates the utilization of the content by a user who neither owns a credit card nor has a bank account.

The invention claimed is:

1. A method of obtaining a decoding key for decoding encrypted content, said method comprising:
   acquiring, by a second content user from a first content user, a medium on which identification data, the encrypted content, and possibility of resale information are recorded, the first content user having previously accessed and decoded the encrypted content at a first user terminal associated with the first content user;
   transmitting the identification data and the possibility of resale information to a content use rights management center using a second user terminal associated with the second content user;
   receiving, from the content use rights management center using the second user terminal, a decoding key based on the transmitted identification data when the content use rights management center determines based on the transmitted possibility of resale information that the content use rights may be sold; and
   decoding, using the second user terminal, the encrypted content using the decoding key.

2. The method of claim 1, wherein a purchase price for the medium is determined by a number of times that the decoding key may be transmitted from the content use rights management center.

3. The method of claim 1, wherein the identification data includes a content identifier, a serial number and an electronic signature of an issuing organization.

4. The method of claim 3, wherein the electronic signature is generated using open key encryption.

5. The method of claim 1, wherein the identification data is transmitted via a network using the second user terminal and the decoding key is received via the network using the second user terminal.

6. The method of claim 1, wherein the received decoding key is encrypted, and said method further comprises decrypting, using the second user terminal, the decoding key prior to decoding the encrypted content.

7. The method of claim 1, wherein a purchase price for the medium is determined by a number of times that the medium may be transferred from one user to another.

8. A method of delivering a decoding key for decoding encrypted content, said method comprising:
   storing, at a content use rights management center, information associating a medium with a first content user, the first content user having previously accessed and decoded the encrypted content at a first user terminal associated with the first content user;
   receiving, at the content use rights management center from a second user terminal associated with a second content user, identification data and possibility of resale information recorded on the medium;
   determining, at the content use rights management center based on the received possibility of resale information, whether content use rights associated with the medium may be resold; and
   when the content use rights management center determines that the content use rights may be sold,
   generating, at the content use rights management center; a decoding key based on the received identification data, and
   transmitting the decoding key from the content use rights management center to the second user terminal to enable the second user terminal to decode the encrypted content using the decoding key.

9. The method of claim 8, wherein the identification data includes a content identifier, a serial number and an electronic signature of an issuing organization.

10. The method of claim 8, further comprising extracting, from a database at the content use rights management center, a number of times that the decoding key previously has been transmitted and a predetermined limit based on the received identification data.

11. The method of claim 8, further comprising incrementing by one, at the content use rights management center, a number of times that the decoding key previously has been transmitted.

12. The method of claim 8, further comprising encrypting, at the content use rights management center prior to transmitting decoding key, the decoding key using a session key.

13. The method of claim 8, wherein the identification data is received at the content use rights management center via a network and the decoding key is transmitted by the content use rights management center via the network.

14. A method of providing a decoding key for decoding encrypted content, said method comprising:
   acquiring and decoding the encrypted content, using a first user terminal associated with a first content user, using a medium on which identification data, the encrypted content, and possibility of resale information are recorded;
   transferring the medium from the first content user to a second content user;
   transmitting the identification data and the possibility of resale information from a second user terminal associated with the second content user to a content use rights management center;
   determining, at the content use rights management center based on the transmitted possibility of resale information, whether content use rights associated with the medium may be resold; and
   when the content use rights management center determines that the content use rights may be sold,
   generating, at the content use rights management center, a decoding key based on the transmitted identification data,
   transmitting the decoding key from the content use rights management center to the second user terminal; and
   decoding, at the second user terminal, the encrypted content using the decoding key.

15. A system for providing a decoding key for decoding encrypted content, said system comprising:
   a medium on which identification data, the encrypted content, and possibility of resale information are recorded, the medium being initially acquired by a first content user and then transferred from the first content user to a second content user after the first content user has accessed and decoded the encrypted content using a first user terminal associated with the first content user;

a second user terminal associated with the second content user; and a content use rights management center;

said second user terminal including:

a user communications unit operable to transmit, to said content use rights management center, the identification data and the possibility of resale information recorded on the medium;

said content use rights management center including:

another communications unit operable to receive the identification data and the possibility of resale information transmitted by the user communications unit of the second user terminal, and a processor operable to determine, based on the transmitted possibility of resale information, whether content use rights associated with the medium may be resold, and to generate a decoding key based on the transmitted identification data, said another communications unit being further operable to transmit the decoding key to said user communications unit of the second user terminal when the processor determines that the content use rights may be sold;

said user communications unit of said second user terminal being further operable to receive the transmitted decoding key;

said second user terminal further including:

an encryption processor operable to decode the encrypted content using the decoding key.

16. A recordable medium recorded with instructions for carrying out a method of obtaining a decoding key for decoding encrypted content, said carrying out comprising:

acquiring, by a second content user from a first content user, a medium on which identification data, the encrypted content, and possibility of resale information are recorded, the first content user having previously accessed and decoded the encrypted content at a first user terminal associated with the first content user;

transmitting the identification data and the possibility of resale information to a content use rights management center using a second user terminal associated with the second content user;

receiving, from the content use rights management center, a decoding key based on the transmitted identification data when the content use rights management center determines based on the transmitted possibility of resale information that the content use rights may be sold; and decoding, using the second user terminal, the encrypted content using the decoding key.

17. A recordable medium recorded with instructions for carrying out a method of delivering a decoding key for decoding encrypted content, said method comprising:

storing, at a content use rights management center, information associating a medium with a first content user, the first content user having previously accessed and decoded the encrypted content at a first user terminal associated with the first content user;

receiving, at the content use rights management center from a second user terminal associated with a second content user, identification data and possibility of resale information recorded on the medium; determining, at the content use rights management center based on the transmitted possibility of resale information, whether content use rights associated with the medium may be resold; and when the content use rights management center determines that the content use rights may be sold, generating, at the content use rights management center, a decoding key based on the transmitted identification data, and transmitting the decoding key from the content use rights management center to the second user terminal to enable the user terminal to decode the encrypted content using the decoding key.

* * * * *

UNITED STATES PATENT AND TRADEMARK OFFICE
CERTIFICATE OF CORRECTION

PATENT NO. : 7,124,443 B2
APPLICATION NO. : 09/958731
DATED : October 17, 2006
INVENTOR(S) : Yoshihito Ishibashi and Taizo Shirai It is certified that error appears in the above-identified patent and that said Letters Patent is hereby corrected as shown below:

Column 12, line 32, " $Xc=\neq 2-2Xa,$ " should read -- $Xc=\lambda 2-2Xa,$ --.

Signed and Sealed this

Thirteenth Day of February, 2007

JON W. DUDAS
*Director of the United States Patent and Trademark Office*